US010547922B2

(12) United States Patent
Zhang

(10) Patent No.: US 10,547,922 B2
(45) Date of Patent: Jan. 28, 2020

(54) SOLAR SPEAKER SELF-ADJUSTING CONTROL SYSTEM

(71) Applicant: YUYAO FEITE PLASTIC CO., LTD., Yuyao, Zhejiang Province (CN)

(72) Inventor: Shanqin Zhang, Yuyao (CN)

(73) Assignee: YUYAO FEITE PLASTIC CO., LTD., Yuyao, Zhejiang Province (CN)

( * ) Notice: Subject to any disclaimer, the term of this patent is extended or adjusted under 35 U.S.C. 154(b) by 0 days.

(21) Appl. No.: 16/095,437

(22) PCT Filed: Jun. 30, 2017

(86) PCT No.: PCT/CN2017/091073
§ 371 (c)(1),
(2) Date: Jan. 3, 2019

(87) PCT Pub. No.: WO2018/223447
PCT Pub. Date: Dec. 13, 2018

(65) Prior Publication Data
US 2019/0124429 A1 Apr. 25, 2019

(30) Foreign Application Priority Data

Jun. 6, 2017 (CN) .......................... 2017 1 0418599

(51) Int. Cl.
H04R 1/02 (2006.01)
H04N 5/225 (2006.01)
(Continued)

(52) U.S. Cl.
CPC ........... H04R 1/025 (2013.01); G08G 1/0112 (2013.01); H02S 10/40 (2014.12); H02S 30/20 (2014.12);
(Continued)

(58) Field of Classification Search
CPC combination set(s) only.
See application file for complete search history.

(56) References Cited

U.S. PATENT DOCUMENTS 5,108,335 A    4/1992  Carey et al.
2008/0219458 A1*  9/2008  Brooks ................... H03G 3/32
                                                              381/57

FOREIGN PATENT DOCUMENTS

CN    2864833 Y  *  1/2007
CN    2864833 Y     1/2007
(Continued)

OTHER PUBLICATIONS

International Search Report issued in International Application No. PCT/CN2017/091073, dated Mar. 7, 2018.
(Continued)

Primary Examiner — Thai Q Tran
Assistant Examiner — Girumsew Wendmagegn
(74) Attorney, Agent, or Firm — Charles C. Achkar; Ostrolenk Faber LLP.

(57) ABSTRACT

A solar speaker self-adjusting control system includes a photovoltaic panel, a voltage conversion device, a speaker device, an embedded processing device, and a calling device. The photovoltaic panel is for receiving solar energy and outputting a voltage signal; the voltage conversion device is connected to the photovoltaic panel for converting the voltage signal outputted by the photovoltaic panel into voltage values required by the system; the embedded processing device is connected to the calling device and speaker device for converting a voice signal transmitted from the calling device into a control current that drives the operation of the speaker device; and the calling device is embedded into a dashboard at a front end of the motor vehicle and connected to the embedded processing device installed in (Continued)

the dashboard at the front end of the motor vehicle through a cable. This system achieves the self-adjusting control effect of a solar speaker.

5 Claims, 2 Drawing Sheets

(51) Int. Cl.
    *H04N 5/232* (2006.01)
    *H04N 7/18* (2006.01)
    *G08G 1/01* (2006.01)
    *H02S 10/40* (2014.01)
    *H02S 30/20* (2014.01)
    *H02S 40/32* (2014.01)
    *H04R 3/00* (2006.01)
    *G06T 5/00* (2006.01)
    *G06T 5/10* (2006.01)
    *G06T 5/20* (2006.01)

(52) U.S. Cl.
    CPC ........... *H02S 40/32* (2014.12); *H04N 5/2253* (2013.01); *H04N 5/23238* (2013.01); *H04N 7/188* (2013.01); *H04R 3/00* (2013.01); *G06T 5/002* (2013.01); *G06T 5/10* (2013.01); *G06T 5/20* (2013.01); *G06T 2207/20021* (2013.01); *G06T 2207/30236* (2013.01); *G06T 2207/30252* (2013.01); *H04R 2499/13* (2013.01)

(56) References Cited

FOREIGN PATENT DOCUMENTS

| | | |
|---|---|---|
| CN | 2867473 Y | 2/2007 |
| CN | 101554860 A | 10/2009 |
| CN | 204605644 U | 9/2015 |
| CN | 108932858 A * | 12/2018 |
| EP | 0457487 B1 | 1/1996 |

OTHER PUBLICATIONS

Written Opinion of the International Searching Authority issued in International Application No. PCT/CN2017/091073, dated Mar. 7, 2018.

* cited by examiner

US 10,547,922 B2

SOLAR SPEAKER SELF-ADJUSTING CONTROL SYSTEM

CROSS REFERENCE TO RELATED APPLICATIONS

The present application is a § 371 National Phase application based on PCT/CN2017/091073 filed Jun. 30, 2017, which claims the benefit of China application No. 201710418599.4 filed Jun. 6, 2017, the subject matter of each of which is incorporated by reference in their entirety.

FIELD OF THE INVENTION

This disclosure relates to the field of speaker controls, and more particularly to a solar speaker self-adjusting control system.

BACKGROUND OF THE INVENTION

Speakers are generally divided by the principle of energy conversion into different types including electric (dynamic), electrostatic (capacitive), electromagnetic (reed), or piezoelectric (crystalline) speakers, etc. The last two types are used extensively in rural broadcasting networks, and these speakers are divided by the range of frequency into low-frequency speakers, mid-frequency speakers, and high-frequency speakers and all these speakers are usually installed and combined into a sound box for use.

The speakers may also be divided by the mechanism and structure of energy conversion into dynamic (electric), capacitive (electrostatic), piezoelectric (crystalline or ceramic) electromagnetic (compressed spring), electric ion, or pneumatic speakers, etc., wherein the electric speakers have the advantages of good electroacoustic performance, robust structure, and low cost, and thus provide a wide range of applications. The speakers may also be divided by their acoustic radiating material into paper cone, horn, and diaphragm speakers, wherein the paper cone speakers are divided into circular, elliptic, double-cone, and rubber ring speakers. The speakers may also be divided by the working frequency into bass, midrange, and treble speakers, and some speakers are divided into those designated for answering machines, televisions, and general and high fidelity sound boxes, and some speakers are divided by the impedance of voice coils into low impedance and high impedance speakers, and some speakers are divided by their effect into straight and surrounding sound speakers.

In conventional vehicle speakers, most of these speakers cannot the playing frequency by themselves according to the congestion situation ahead, so that the conventional vehicle speakers provide unsatisfactory warning effect or poor playback performance.

In view of the aforementioned drawbacks of the prior art, the discloser of this disclosure based on years of experience to conduct extensive research and experiment, and finally provided a feasible solution to overcome the drawbacks of the prior art.

SUMMARY OF THE INVENTION

Therefore, it is a primary objective of this disclosure to provide a solar speaker self-adjusting control system capable of diving an image according to a predetermined vehicle contour characteristic into a plurality of vehicle sub-images, confirming the current traffic congestion according to the quantity of the plurality of vehicle sub-images, and confirming the playing frequency of an accompanying sound device and the playing frequency of a speaker device according to the current traffic congestion, wherein the worse the current traffic congestion, the higher the playing frequency of the accompanying sound device and the playing frequency of the speaker device.

To achieve the aforementioned and other objectives, this disclosure provides a solar speaker self-adjusting control system comprising a photovoltaic panel, a voltage conversion device, a speaker device, an embedded processing device, and a calling device, characterized in that the photovoltaic panel is for receiving solar energy and outputting a voltage signal, and the voltage conversion device is coupled to the photovoltaic panel for converting the voltage signal outputted from the photovoltaic panel into each voltage value required by the system, and the embedded processing device is coupled to the calling device and the speaker device for converting a voice signal transmitted from the calling device into a control current for driving the operation of the speaker device; wherein the calling device is embedded into a dashboard installed at a front end of a motor vehicle and coupled to an embedded processing device which is installed into the dashboard through a cable.

Specifically, the solar speaker self-adjusting control system further comprises an accompanying sound device coupled to the embedded processing device and a dual-channel speaker for issuing a corresponding accompanying sound signal when the embedded processing device controls the speaker device to play the voice signal transmitted from the calling device.

Specifically, the solar speaker self-adjusting control system further comprises a retractable stand mounted onto a roof of a motor vehicle for fixing the speaker device and the photovoltaic panel; wherein the accompanying sound device is also installed onto the retractable stand.

In the solar speaker self-adjusting control system, the corresponding accompanying sound signal issued by the accompanying sound device has an amplitude directly proportional to the amplitude of the voice signal transmitted from the calling device and played by the speaker device.

Specifically, the solar speaker self-adjusting control system further comprises: a humidity detecting device installed onto a roof of motor vehicle for detecting the humidity near the motor vehicle and using the detected humidity as an instant humidity output; the embedded processing device being coupled to the humidity detecting device and the retractable stand for controlling the retractable stand to retract automatically when the instant humidity is greater than or equal to a predetermined humidity threshold and controlling the retractable stand to extend automatically when the instant humidity is smaller than the predetermined humidity threshold; a gun camera, mounted onto the retractable stand, for capturing image data around the neighborhood of the motor vehicle to obtain a high-definition panoramic image; an initial filtering device, coupled to the gun camera, for receiving the high-definition panoramic image, while carrying out a wavelet filter processing, a Wiener filter processing, a median filter processing and a Gaussian low-pass filter processing of the high-definition panoramic image to obtain a first filtered image, a second filtered image, a third filtered image and a fourth filtered image respectively, carrying out a signal-to-noise ratio analysis of the first filtered image, the second filtered image, the third filtered image and the fourth filtered image to obtain a first signal-to-noise ratio, a second signal-to-noise ratio, a third signal-to-noise ratio and a fourth signal-to-noise ratio respectively, selecting the signal-to-noise ratio with the largest numerical value from the four signal-to-noise ratios as a target signal-to-noise ratio, and using the filtered image corresponding to the target signal-to-noise ratio as a target filtered image; a signal analysis processing device, coupled to the initial filtering device, for preforming a noise component analysis of the target filtered image to obtain various types of noises in the target filtered image and corresponding to each noise signal component, and selecting three noise signal components of the largest amplitudes and dividing the three noise signal components into a first noise signal component, a second noise signal component and a third noise signal component according to a descending order of their amplitudes, and searching an image filtering template corresponding to the first noise signal component, the second noise signal component and the third noise signal component from an image filtering template library as a first filter template, a second filter template and a third filter template respectively, and sequentially carrying out a filter processing of the target filtered image according to the first filter template, the second filter template and the third filter template to obtain a final filtered image; a congestion detection device, coupled to the signal analysis processing device, for receiving the final filtered image, dividing the final filtered image into a plurality of vehicle sub-images according to a predetermined vehicle contour characteristic, and confirming the current traffic congestion according to the quantity of the plurality of vehicle sub-images; the embedded processing device, being coupled to the congestion detection device, for receiving the current traffic congestion, and confirming the playing frequency of the accompanying sound device and the playing frequency of the speaker device according to the current traffic congestion; wherein the greater the current traffic congestion, the higher the playing frequency of the accompanying sound device and the playing frequency of the speaker device.

Specifically, the solar speaker self-adjusting control system further comprises a frequency division duplex communication interface coupled to the embedded processing device for sending the received current traffic congestion to the remote traffic control center.

Specifically, the solar speaker self-adjusting control system further comprises a GPS navigation device installed in the dashboard at the front end of the motor vehicle, for detecting and outputting current vehicle navigation location; wherein the frequency division duplex communication interface is coupled to the GPS navigation device for sending the received current traffic congestion and current vehicle navigation location to the remote traffic control center.

Specifically, the solar speaker self-adjusting control system further comprises a display device installed in the dashboard at the front end of the motor vehicle, and coupled to the embedded processing device for instantly displaying the current traffic congestion and the accompanying sound device and the playing frequency of the speaker device.

In the solar speaker self-adjusting control system, the display device is a liquid crystal display (LCD) display device or a light emitting diode (LED) display device.

BRIEF DESCRIPTION OF NUMERALS IN THE FIGURES

1: Photovoltaic Panel; 2: Voltage Conversion Device; 3: Speaker Device; 4: Embedded Processing Device; 5: Calling Device; 6: Initial Filtering Device; 61: First Filtering Device; 62: Second Filtering Device, 63: Third Filtering Device, 64: Fourth Filtering Device; 65: Analysis and comparison unit.

DESCRIPTION OF THE PREFERRED EMBODIMENTS

The technical contents of this disclosure will become apparent with the detailed description of preferred embodiments accompanied with the illustration of related drawings as follows. It is intended that the embodiments and figures disclosed herein are to be considered illustrative rather than restrictive.

In various types of speakers, the paper cone speakers with the advantages of natural tone, low price, good rigidity, lightweight material, and high sensitivity and the disadvantages of poor moisture resistance, and difficult control of consistency during the manufacture are used extensively in high-end HiFi systems. Since the sound output is very uniform, the reproduction is excellent, and the bounce resisting fabric with relatively wide frequency response and low distortion, paper cone speakers have become the first choice for those who love strong bass, but the drawbacks are high cost, complicated manufacturing process, mediocre sensitivity, and poor light music effect. Wool cone speakers come with soft texture and give excellent performance for soft and light music, but the bass is not good, lacking strength and shock. Polypropylene (PP) cone speakers are popular in high-end sound boxes and have the features of good consistency, low distortion and remarkable performance in all aspects. In addition, there are fiber diaphragms and composite diaphragms, but their price is very high and thus rarely used in general sound boxes.

The current vehicle speaker has low self-adjusting performance and fails to adjust its own playing frequency according to the road conditions instantly and thus leads to a poor playing effect. Therefore, this disclosure provides a solar speaker self-adjusting control system to overcome the aforementioned deficiencies.

Figure 1:
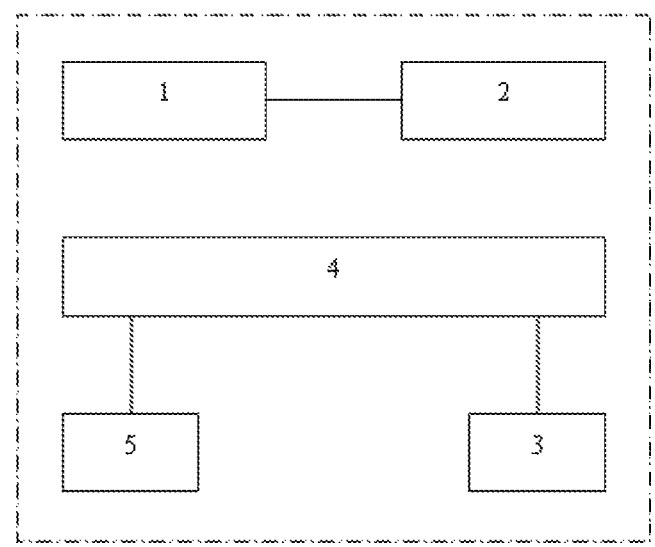
FIG. 1 is a structural block diagram of a solar speaker self-adjusting control system in accordance with an embodiment of this disclosure.
Figure 2:
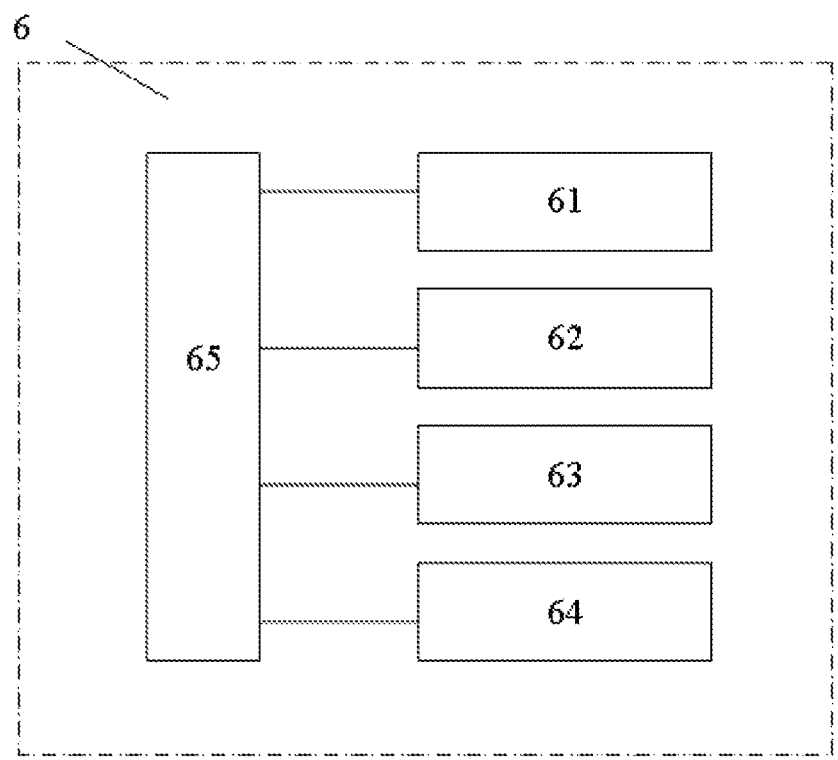
FIG. 2 is a structural block diagram of an initial filtering device of a solar speaker self-adjusting control system in accordance with an embodiment of this disclosure.

With reference to FIG. 1 for a structural block diagram of a solar speaker self-adjusting control system in accordance with an embodiment of this disclosure, the system comprises a photovoltaic panel, a voltage conversion device, a speaker device, an embedded processing device and a calling device, and the photovoltaic panel is provided for receiving solar energy and outputting a voltage signal, and the voltage conversion device is coupled to the photovoltaic panel for converting the voltage signal outputted from the photovoltaic panel into each voltage value required by the system, and the embedded processing device is coupled to the calling device and the speaker device for converting a voice signal transmitted from the calling device into a control current for driving the operation of the speaker device; wherein the calling device is embedded into a dashboard at a front end of a motor vehicle, and coupled to an embedded processing device in the dashboard at the front end of the motor vehicle through a cable.

The structure of the solar speaker self-adjusting control system of this disclosure will be described in details below.

The control system further comprises an accompanying sound device coupled to the embedded processing device, and a dual-channel speaker for issuing a corresponding accompanying sound signal when the embedded processing device controls the speaker device to play a voice signal transmitted from the calling device.

The control system further comprises a retractable stand mounted onto a roof of a motor vehicle for fixing the speaker device and the photovoltaic panel; wherein the accompanying sound device is also installed onto the retractable stand.

In the control system, the corresponding accompanying sound signal issued by the accompanying sound device has an amplitude directly proportional to the amplitude of the voice signal transmitted from the calling device and played by the speaker device.

The control system further comprises: a humidity detecting device installed onto a roof of motor vehicle for detecting the humidity near the motor vehicle and using the detected humidity as an instant humidity output; the embedded processing device being coupled to the humidity detecting device and the retractable stand for controlling the retractable stand to retract automatically when the instant humidity is greater than or equal to a predetermined humidity threshold and controlling the retractable stand to extend automatically when the instant humidity is smaller than the predetermined humidity threshold; a gun camera, mounted onto the retractable stand, for capturing image data around the neighborhood of the motor vehicle to obtain a high-definition panoramic image; an initial filtering device, coupled to the gun camera, for receiving the high-definition panoramic image, while carrying out a wavelet filter processing, a Wiener filter processing, a median filter processing and a Gaussian low-pass filter processing of the high-definition panoramic image to obtain a first filtered image, a second filtered image, a third filtered image and a fourth filtered image respectively, carrying out a signal-to-noise ratio analysis of the first filtered image, the second filtered image, the third filtered image and the fourth filtered image to obtain a first signal-to-noise ratio, a second signal-to-noise ratio, a third signal-to-noise ratio and a fourth signal-to-noise ratio respectively, selecting the signal-to-noise ratio with the largest numerical value from the four signal-to-noise ratios as a target signal-to-noise ratio, and using the filtered image corresponding to the target signal-to-noise ratio as a target filtered image; a signal analysis processing device, coupled to the initial filtering device, for preforming a noise component analysis of the target filtered image to obtain various types of noises in the target filtered image and corresponding to each noise signal component, and selecting three noise signal components of the largest amplitudes and dividing the three noise signal components into a first noise signal component, a second noise signal component and a third noise signal component according to a descending order of their amplitudes, and searching an image filtering template corresponding to the first noise signal component, the second noise signal component and the third noise signal component from an image filtering template library as a first filter template, a second filter template and a third filter template respectively, and sequentially carrying out a filter processing of the target filtered image according to the first filter template, the second filter template and the third filter template to obtain a final filtered image; a congestion detection device, coupled to the signal analysis processing device, for receiving the final filtered image, dividing the final filtered image into a plurality of vehicle sub-images according to a predetermined vehicle contour characteristic, and confirming the current traffic congestion according to the quantity of the plurality of vehicle sub-images; the embedded processing device, being coupled to the congestion detection device, for receiving the current traffic congestion, and confirming the playing frequency of the accompanying sound device and the playing frequency of the speaker device according to the current traffic congestion; wherein, the greater the current traffic congestion, the higher the playing frequency of the accompanying sound device and the playing frequency of the speaker device.

The control system further comprises a frequency division duplex communication interface coupled to the embedded processing device for sending the received current traffic congestion to the remote traffic control center.

The control system further comprises a GPS navigation device, installed in the dashboard at the front end of the motor vehicle, for detecting and outputting current vehicle navigation location; wherein the frequency division duplex communication interface is coupled to the GPS navigation device for sending the received current traffic congestion and current vehicle navigation location to the remote traffic control center.

The control system further comprises a display device installed in the dashboard at the front end of the motor vehicle, and coupled to the embedded processing device for instantly displaying the current traffic congestion and the accompanying sound device and the playing frequency of the speaker device.

In the control system, the display device is a liquid crystal display (LCD) display device or a light emitting diode (LED) display device.

In addition, the GPS is short for Global Positioning System. GPS began in 1958 as a project of the U.S. military, and was put into use in 1964. In 1970s, the U.S. Army, Navy, and Air Force jointly developed a new generation satellite positioning system GPS. The main purpose is to provide instant, all-weather and global navigation services for the three major areas of land, sea and air and for military purpose such as intelligence gathering, nuclear explosion monitoring, and emergency communications. After more than 20 years of research and experiment with the cost of 30 billion U.S. dollars, the setup of 24 GPS satellite constellations with a global coverage of 98% was completed in 1994.

The basic principle of the GPS navigation system is to measure the distance between a satellite of a known position and a user's receiver and then combine the data of multiple satellites to obtain the specific position of the user's receiver. To achieve the aforementioned purpose, the position of the satellite can be found from a satellite ephemeris according to the time recorded by an onboard clock. The time for transmitting the distance between the user's receiver and the satellite through a recorded satellite signal is multiplied by the speed of light (Since there is interference in the ionosphere of the atmospheric, and this distance is not the real distance between the user and the satellite, but is a pseudo range (PR). If the GPS satellite is working normally, the satellite will transmit navigation messages continuously with a pseudo-random code (virtual code) consisting of 1 and 0 binary symbols. There are two types of virtual codes used by the GPS system, respectively: a civil C/A code and a military P(Y) code. The C/A code has a frequency of 1.023 MHz, a repeated cycle of 1 millisecond, and a code spacing of 1 microsecond (equivalent to 300 m); and the P code has a frequency of 10.23 MHz, a repeated cycle of 266.4 days, and a code spacing of 0.1 microsecond (equivalent to 30 m). The Y code is formed based on the P code with a better confidentiality. The navigation message includes the information such as satellite ephemeris, working condition, clock correction, ionospheric delay correction, atmospheric refraction correction, etc. The navigation message is demodulated from satellite signals and transmitted on a carrier frequency of 50b/s modulation. The navigation message contains 5 sub-frames in each main frame, and each sub-frame has a length of 6 s. Each of the first three frames has 10 character codes and is repeated once every 30 seconds and updated once per hour. The last two frames have a total of 15000 b. The main content of the navigation message primarily contains telemetry codes, conversion codes, first, second, and third data blocks, and most importantly ephemeris data. When a user receives the navigation message, the satellite time is fetched and compared with the user's own time to obtain the distance between the satellite and the user, and then the satellite ephemeris data in the navigation message are used to estimate the position of the satellite which transmits the navigation message, and the user can know the information such as the position and speed in the WGS-84 geodetic coordinates system.

The solar speaker self-adjusting control system of this disclosure focuses on the technical issue of the conventional vehicle speakers with a single playing mode to conduct a solar energy transformation based on the hardware of the conventional vehicle speaker and add a plurality of image processing devices and a self-adjusting control mechanism for the detection of congestion situations ahead and the self-adjustment of the playing frequency to improve the playing effect of the vehicle speaker.

In summation of the description above, this disclosure are novel, useful, non-obvious, and inventive and comply with the patent application requirements, and thus the disclosure is duly filed for patent application.

While this disclosure has been described by means of specific embodiments, numerous modifications and variations could be made thereto by those skilled in the art without departing from the scope and spirit of this disclosure set forth in the claims.

What is claimed is:

1. A solar speaker self-adjusting control system, comprising a photovoltaic panel, a voltage conversion device, a speaker device, an embedded processing device, and a calling device, characterized in that the photovoltaic panel is for receiving solar energy and outputting a voltage signal, and the voltage conversion device is coupled to the photovoltaic panel for converting the voltage signal outputted from the photovoltaic panel into each voltage value required by the system, and the embedded processing device is coupled to the calling device and the speaker device for converting a voice signal transmitted from the calling device into a control current for driving the operation of the speaker device; wherein the calling device is embedded into a dashboard installed at a front end of a motor vehicle and coupled an embedded processing device installed into the dashboard at the front end of the motor vehicle through a cable; and further comprising:

an accompanying sound device coupled to the embedded processing device and a dual-channel speaker for issuing a corresponding accompanying sound signal when the embedded processing device controls the speaker device to play the voice signal transmitted from the calling device;

a retractable stand mounted onto a roof of a motor vehicle for fixing the speaker device and the photovoltaic panel; wherein the accompanying sound device is also installed onto the retractable stand;

wherein the corresponding accompanying sound signal issued by the accompanying sound device has an amplitude directly proportional to the amplitude of the voice signal transmitted from the calling device and played by the speaker device;

a humidity detecting device installed onto a roof of motor vehicle for detecting the humidity near the motor vehicle and using the detected humidity as an instant humidity output, and the embedded processing device being coupled to the humidity detecting device and the retractable stand for controlling the retractable stand to retract automatically when the instant humidity is greater than or equal to a predetermined humidity threshold and controlling the retractable stand to extend automatically when the instant humidity is smaller than the predetermined humidity threshold;

a gun camera, mounted onto the retractable stand, for capturing image data around the neighborhood of the motor vehicle to obtain a high-definition panoramic image;

an initial filtering device, coupled to the gun camera, for receiving the high-definition panoramic image, while carrying out a wavelet filter processing, a Wiener filter processing, a median filter processing and a Gaussian low-pass filter processing of the high-definition panoramic image to obtain a first filtered image, a second filtered image, a third filtered image and a fourth filtered image respectively, carrying out a signal-to-noise ratio analysis of the first filtered image, the second filtered image, the third filtered image and the fourth filtered image to obtain a first signal-to-noise ratio, a second signal-to-noise ratio, a third signal-to-noise ratio and a fourth signal-to-noise ratio respectively, selecting the signal-to-noise ratio with the largest numerical value from the four signal-to-noise ratios as a target signal-to-noise ratio, and using the filtered image corresponding to the target signal-to-noise ratio as a target filtered image;

a signal analysis processing device, coupled to the initial filtering device, for preforming a noise component analysis of the target filtered image to obtain various types of noises in the target filtered image and corresponding to each noise signal component, and selecting three noise signal components of the largest amplitudes and dividing the three noise signal components into a first noise signal component, a second noise signal component and a third noise signal component according to a descending order of their amplitudes, and searching an image filtering template corresponding to the first noise signal component, the second noise signal component and the third noise signal component from an image filtering template library as a first filter template, a second filter template and a third filter template respectively, and sequentially carrying out a filter processing of the target filtered image according to the first filter template, the second filter template and the third filter template to obtain a final filtered image;

a congestion detection device, coupled to the signal analysis processing device, for receiving the final filtered image, dividing the final filtered image into a plurality of vehicle sub-images according to a predetermined vehicle contour characteristic, and confirming the current traffic congestion according to the quantity of the plurality of vehicle sub-images;

the embedded processing device, being coupled to the congestion detection device, for receiving the current traffic congestion, and confirming the playing frequency of the accompanying sound device and the playing frequency of the speaker device according to the current traffic congestion;

wherein, the greater the current traffic congestion, the higher the playing frequency of the accompanying sound device and the playing frequency of the speaker device.

2. The solar speaker self-adjusting control system of claim 1, further comprising a frequency division duplex communication interface coupled to the embedded processing device for sending the received current traffic congestion to the remote traffic control center.

3. The solar speaker self-adjusting control system of claim 2, further comprising a GPS navigation device, installed in the dashboard at the front end of the motor vehicle, for detecting and outputting current vehicle navigation location; wherein the frequency division duplex communication interface is coupled to the GPS navigation device for sending the received current traffic congestion and current vehicle navigation location to the remote traffic control center.

4. The solar speaker self-adjusting control system of claim 3, further comprising a display device installed in the dashboard at the front end of the motor vehicle, and coupled to the embedded processing device for instantly displaying the current traffic congestion and the accompanying sound device and the playing frequency of the speaker device.

5. The solar speaker self-adjusting control system of claim 4, wherein the display device is a liquid crystal display (LCD) display device or a light emitting diode (LED) display device.

* * * * *